United States Patent
Ayoub

(10) Patent No.: US 10,281,980 B2
(45) Date of Patent: May 7, 2019

(54) SYSTEM AND METHOD FOR EYE-REACTIVE DISPLAY

(71) Applicant: Ihab Ayoub, San Antonio, TX (US)

(72) Inventor: Ihab Ayoub, San Antonio, TX (US)

(*) Notice: Subject to any disclaimer, the term of this patent is extended or adjusted under 35 U.S.C. 154(b) by 0 days.

(21) Appl. No.: 15/276,701

(22) Filed: Sep. 26, 2016

(65) Prior Publication Data

US 2018/0088666 A1    Mar. 29, 2018

(51) Int. Cl.
*G06F 3/01* (2006.01)
*G09G 5/30* (2006.01)
*G06K 9/00* (2006.01)
*G09G 5/26* (2006.01)

(52) U.S. Cl.
CPC ......... *G06F 3/013* (2013.01); *G06K 9/00604* (2013.01); *G09G 5/30* (2013.01); *G09G 5/26* (2013.01); *G09G 2320/066* (2013.01); *G09G 2320/08* (2013.01); *G09G 2354/00* (2013.01)

(58) Field of Classification Search
CPC . A61H 5/00; G09F 19/12; G09G 5/14; G09G 3/001; G09G 5/08
See application file for complete search history.

(56) References Cited

U.S. PATENT DOCUMENTS

| 9,286,515 | B2 | 3/2016 | Nakamura et al. |
| 9,335,819 | B1 | 5/2016 | Jaeger et al. |
| 2008/0259098 | A1 | 10/2008 | Zamorsky et al. |
| 2010/0296054 | A1* | 11/2010 | Fateh ................ A61B 3/024 351/203 |
| 2014/0049462 | A1 | 2/2014 | Weinberger et al. |
| 2014/0054449 | A1 | 2/2014 | Wang et al. |
| 2014/0064578 | A1 | 3/2014 | Choe |
| 2014/0092006 | A1* | 4/2014 | Boelter ................ G06F 3/013 345/156 |
| 2015/0145777 | A1 | 5/2015 | He et al. |
| 2015/0179149 | A1 | 6/2015 | Park |
| 2015/0208125 | A1 | 7/2015 | Robinson |
| 2015/0356714 | A1 | 12/2015 | Moalem |
| 2016/0019868 | A1 | 1/2016 | Park et al. |
| 2016/0041614 | A1 | 2/2016 | Mok et al. |
| 2016/0045108 | A1 | 2/2016 | Wu |
| 2016/0104036 | A1 | 4/2016 | Tsou et al. |
| 2016/0161740 | A1 | 6/2016 | Bar-Zeev et al. |
| 2016/0174879 | A1 | 6/2016 | Yekutieli |
| 2016/0253778 | A1 | 9/2016 | Ballard |
| 2016/0259405 | A1 | 9/2016 | Wilson et al. |
| 2016/0262614 | A1 | 9/2016 | Ninomiya et al. |

* cited by examiner

*Primary Examiner* — Shaheda A Abdin
(74) *Attorney, Agent, or Firm* — Ayoub IP; Ahab S. Ayoub

(57) ABSTRACT

A computerized method, system for, and computer-readable medium operable to: detect an eye condition of a viewer of displayed content; assess the eye condition against predetermined criteria; identify a preferred behavior selected to improve the eye condition; and alter the displayed content in a predetermined manner selected to induce the preferred behavior.

20 Claims, 2 Drawing Sheets

SYSTEM AND METHOD FOR EYE-REACTIVE DISPLAY

BACKGROUND

Field

Embodiments relate generally to reducing and avoiding eye problems in a viewer of displayed content.

Background

As users of electronic devices are exposed to longer periods of viewing displayed content, the risk of eye strain, damage and discomfort increases. Symptoms of eye strain may include red, sore, tired, burning or itching eyes, watery or dry eyes, blurred or double vision, headaches, increased sensitivity to light and difficulty concentrating.

One of the most common causes of eye strain and eye fatigue is extended viewing of content from digital devices. This type of eye strain is sometimes known as computer vision syndrome, and is believed to affect up to 90% of computer workers. The increased risk posed by digital devices is possibly intensified by certain user behaviors such as positioning of these devices too close or too far from the eyes, which forces the eyes to work harder.

Extended viewing of displayed content from a digital device is also believed to be linked to a reduction in blinking. Blinking naturally moisturizes and refreshes the eyes, and it is believed that the rate of blinking may be reduced by as much as 50% when viewing displayed content from an electronic device.

It is commonly recommended that a user of digital displays attempt to blink with increased frequency, and remove their gaze from the display at regular intervals to focus on something in the distance. In practice, however, users rarely follow such regimens, particularly when their attention is consumed by the displayed content.

Various attempts have been made to detect eye fatigue and to encourage healthier eye behaviors such as blinking. One such recent attempt is described in U.S. Published Patent Application No. 2016/0041614, which discloses a method of utilizing the camera of a smart phone or tablet to determine a user's blink rate, capture images of the user's eyes, and display images of the user's eyes on the screen when no blink has been detected for a period of time. While such a system may be effective in both detecting and inducing blink, it will likely not be readily adopted by users due to the distracting nature of the superimposed images. Such a system would also require increased system resources due to the need to capture numerous live photos, perform facial analysis to locate the eyes, crop the eye portion into a separate image, maintain the image in memory, and display both the image and the existing content at the same time.

Accordingly, a need exists for systems and methods to counteract this strain and encourage healthy eye behaviors, while also encouraging user adoption and streamlining system implementation.

SUMMARY

In one aspect, embodiments relate to a system for modifying displayed content to encourage healthier eye behaviors in a viewer of such content, such as regular blinking or change of focus.

In one aspect, embodiments relate to a system including a display device for displaying content to a user, an eye sensor, and a processor, wherein the manner in which the content is displayed in the display device is modified based on a detected condition of the user's eye.

In one aspect, embodiments relate to a method for reducing or preventing eye strain and other adverse conditions in a viewer of displayed content by first determining the existence of a potentially harmful condition, and then inducing a behavior to mitigate or avoid the condition.

In one aspect, embodiments relate to software instructions for implementing a method for reducing eye strain caused or exacerbated by prolonged viewing of displayed content. Such software instructions may be implemented throughout a network to, for example, ensure that a particular group of users are encouraged to implement proper eye care behaviors.

In one aspect, modifications to displayed content are selected to mimic the visual effects of select eye strain or fatigue conditions, such that when the modified content is viewed, it will trigger a natural response in the viewer without unduly interrupting the viewer's concentration.

In one aspect, modifications to displayed content are selected to compensate for a detected eye strain condition.

Other aspects and advantages will be apparent from the following description and the appended claims.

BRIEF DESCRIPTION OF DRAWINGS

The drawings are provided to illustrate example embodiments described herein and are not intended to limit the scope of the disclosure.

DETAILED DESCRIPTION

Figure 1:
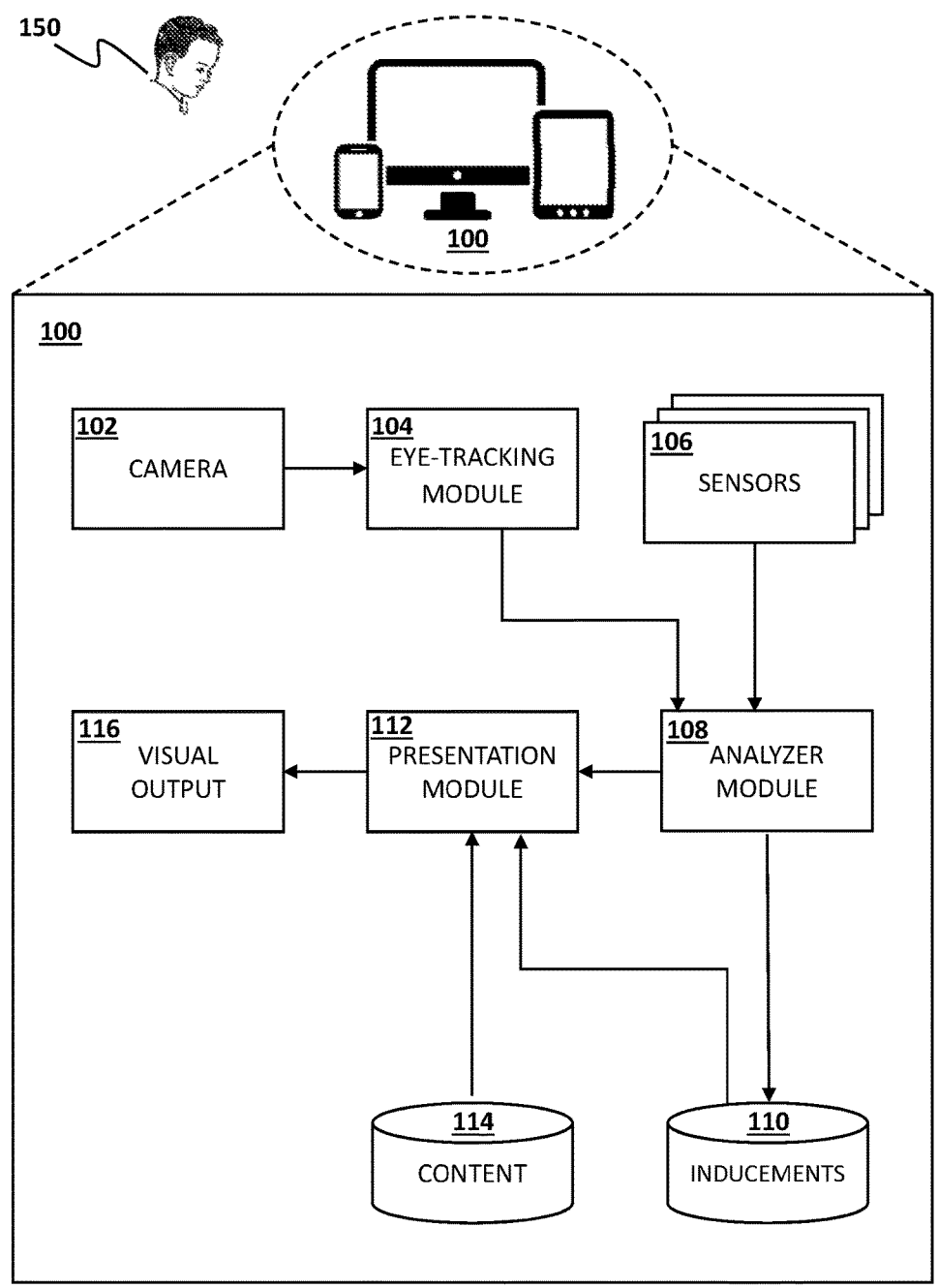
FIG. 1 is a block diagram of an illustrative device that includes various modules and components for managing user interactions with the device, including the introduction of inducements into displayed content.

The present disclosure relates to a content display system that monitors viewer's eyes for indications of adverse eye conditions during viewing and alters characteristics of the displayed content, preferably in a manner that mimics natural eye fatigue symptoms, to induce the viewer to perform an eye-beneficial response such as blinking, refocusing, eye movement, and the like.

Some aspects of the present disclosure relate to creating one or more "inducements" to perform a given behavior by altering the manner in which content is displayed to a viewer. Such inducements may include visible changes to displayed content such as, but not limited to, blurring the content, changes to size, location, brightness, contrast, transparency, permanence (e.g., by flickering or altering refresh rate), focal point, and other visible characteristics of the displayed content to simulate various natural eye fatigue and eye strain symptoms.

Inducements are preferably selected to alter displayed content in a manner that simulates or mimics natural eye fatigue symptoms. Thus, a primary benefit of such a system is an increased likelihood of adoption due to the subtlety of at least the initial inducement, preferably in a manner that does not substantially interfere with the viewer's attention to the displayed content. Other benefits include a decreased use of system resources in embodiments that modify output without supplementing extraneous images, and a greater efficacy in embodiments that alter displayed content in a manner that mimics natural eye fatigue symptoms, which will thereby more naturally elicit a desired response in a viewer without significantly detracting from the viewer's concentration.

In general, inducements, as generated by embodiments herein, may be differentiated from prior art notification systems that rely on sounds or the introduction of extraneous visual elements (such as pop-ups, superimposed images, etc.) in that an inducement seeks to encourage a behavior without drawing attention away from the displayed content, whereas prior art notification systems generally introduce additional elements such as sounds or images into the user's attention stream which distract the user to varying degrees. It is believed that decreased interruption of a user's attention will beneficially provide an increased rate of implementation.

Typically, inducements are selected to decrease perceived visual quality of displayed content, thereby inducing a behavior in order to restore the original, or an improved, quality. The degree of inducement may vary over time or based on other criteria. For example, if an initial inducement involving the blurring of content fails to elicit a desired behavior within a set interval, the degree of inducement may be increased (i.e., more blur), or alternatively, additional inducements may be introduced (e.g., flicker, transparency, horizontal or vertical displacement, etc.). Increasing the degree or variety of inducement may advantageously increase the rate of compliance (i.e., likelihood that a desired behavior will occur). Another advantage includes the ability to initially introduce very subtle inducements to minimize distraction and only utilize more obvious inducements if and as required to achieve a desired state of compliance.

Decreased perceived visual quality may advantageously be implemented in a manner selected to mimic symptoms of certain eye strain or other adverse eye conditions, thereby naturally eliciting a response from a user that would typically be that used to prevent or remedy the condition. Such mimicry of adverse eye status symptoms can thereby encourage remedial action by a user prior to developing an actual condition, or prior to the aggravation of any such condition due to e.g., extended viewing of visual content without performing eye strain mitigating behaviors.

Alternatively, visual content may advantageously be modified to compensate for a detected eye status. For example, if sensors detect that a user is squinting at content (by e.g., detecting extended semi-closed orientation of eyelids, or corresponding eye-muscle behaviors), the visual content being presented may be magnified until the squinting is no longer detected. If squinting continues despite magnification, the system may then implement other compensatory changes to the displayed content such as e.g., changing the focal depth, brightness, contrast, or other characteristics, until the sensors detect that the user's eyes are no longer straining while viewing the content.

Compensatory modifiers may be used in lieu of mimicry modifiers, or may be used in conjunction with mimicry, depending on the eye status condition detected, or other metrics used in a particular application. For example, embodiments may be configured to blur or flicker content in response to a detected lack of blinking, and also to magnify content in response to a detected squinting or movement of the eyes closer to displayed content. Providing multiple modalities advantageously increases the likelihood that a particular adverse eye status may be prevented or mitigated.

According to aspects of the present disclosure, a sensor such as a camera can be utilized to identify various eye conditions of a viewer of displayed content, based upon criteria relating to characteristics or behaviors of the user's eye. For example, dryness of the eyes might impact the moisture content at the surface of the eye, which might be identified via sensor (e.g., front-facing camera) by detecting reflectivity at the eye surface, or alternatively, dryness may be presumed by observing the frequency of blinking or other moisturizing events. The presence or absence of tears or other fluids may be detected as obscuring a portion of the eye, altering the surface of the eyelids or other areas around the eyes, or increasing the reflectivity of the skin surrounding the eye. Various types of sensors and techniques may be advantageously utilized to determine the existence and degree of various eye conditions.

In use, embodiments will detect, via one or more sensors, certain behaviors and/or conditions of a user's eye(s) (collectively "eye status") when the user is viewing displayed content. Upon determination of a certain eye status, the system will alter the displayed content to encourage or invoke a certain preferred behavior in the user, e.g., blinking, gaze diversion, focal change, etc., selected to improve the eye status.

Eye conditions such as dryness may vary among users and therefore embodiments of the systems and methods disclosed herein may utilize fixed and/or dynamic criteria to determine a threshold for any eye condition. Embodiments may utilize historical observations of a particular user or group of users, and may also use a combination of the two, e.g., initial settings are provided to the system and replaced by, or adjusted in view of, observed data over time.

Examples of relevant eye status conditions and indicators thereof that may be detected via one or more sensors include, but are not limited to, dry eye and degrees thereof, low blink rate, pupil size, movement, reactivity/responsiveness to changes in displayed content, orientation, focus, redness, discharge, and visible orb area. Each of these may relate to a generally preferred condition of the eye, and the preferred condition may be preset (e.g., not user-specific) and/or based upon historical observations of a specific user or user group.

Displayed content is visual content presented to a viewer via one or more display devices and may include text, static images (e.g., photos) and dynamic images (e.g., video). Examples of display devices for presenting displayed content include, but are not limited to, a personal computer, a laptop, a tablet or other computer device with a digital display, an entertainment device such as an LCD, LED, plasma, HD, 3D or other television monitor; a mobile phone display, a wearable interface, such as goggles, virtual reality headsets and helmets, wearable watches, and projectors for projecting content onto a screen, onto a user's eye(s), or in three-dimensional space, a set-top box, gaming console, entertainment system, a GUI of an electronic device, and/or various other electronic devices and appliances relating to the displaying of visual content to a user.

Sensors may include digital image sensors (e.g., cameras) such as those typically present in many computerized devices, infrared sensors, muscle tension sensors, neurological sensors, and other sensors capable of determining the existence of an eye condition either directly via observation of the eye, or indirectly via observation of a certain behavior such as eyelid or other skin or muscle movement or tension, neurological activity, skin characteristics, etc. Detection may be performed via image analysis, or via other mechanisms such as e.g., electrical activity or muscle stimulation affecting the eye, depending on the capabilities of a particular sensor.

Sensors may be configured to operate with ambient light sources, or alternatively may be configured to operate with dedicated light sources such as infrared light projectors utilized to increase detection of certain conditions and characteristics. In one embodiment, sensors will detect ambient light levels and/or levels produced by the display device, and that information will be used in assessing various eye conditions. For example, when bright light is projected by the display device onto an eye that is being sensed, adjustments may be made to the weighting of certain data received from the sensors in evaluating eye status to compensate for light levels at the eye.

Embodiments of the system typically comprise a sensor operatively connected to a processor and a display device. The sensor will preferably be oriented such that a user's eyes will be within the sensing field of the sensor when the user is viewing displayed content. The sensor may be integrated into a display device such as those previously described, or alternatively may be that of a discreet imaging device such as a webcam or stand-alone digital camera, which may be operatively connectible to a display device. While an image sensor is a preferred sensor due to its growing ubiquity in display devices, other forms of a sensor may also be utilized such as, e.g., a muscle tension sensor integrated into a wearable device such as smart glasses or other forms of heads-up displays configured to detect eye status via non-image related techniques. In one embodiment, multiple types of sensors are utilized to determine eye status.

FIG. 1 shows an illustrative display device 100 with various modules and components that may implement some or all of the features described in the present disclosure. The display device 100 may operatively connect to, or contain, one or more processors and a memory which may contain software applications executed by the processors. The various components and modules of the display device 100 may be integrated into a single unit, or may be distributed among multiple operatively-connected devices.

The display device 100 may include various input and/or output components to, e.g., present content to a user 150 and obtain information regarding the user 150 and user interactions. In certain embodiments, the display device 100 may include a camera 102, an eye-tracking module 104 and/or one or more sensors 106 for locating and determining a condition of the user's eyes, respectively, relevant to determining whether one or more inducements selected from an inducement store 110 should be applied to content 114 such as text, images, video and the like, prior to presenting the visual output 116 to the user 150.

A presentation module 112 can obtain content from a content data store 114 located either within the display device 100 or operatively connected thereto via, e.g., various input/output components for connecting to another local or networked device. The analyzer module 108 can use input from the camera 102 and/or other sensors 106 to determine whether to take some action relating to the presentation of content to the user 150. In various embodiments, such actions will relate to predetermined changes to how visual data is displayed to the user, such changes generally identified herein as "inducements" because they are selected to induce a particular behavior/response in the user. Inducements may be stored on-board or in an operatively connected device, in an inducement store 110 and may be retrieved for application to the visual aspects of content 114 prior to visual output 116 to the user 150 based on the determination of an analyzer module 108 that sensor data indicates the existence of a predetermined eye status of the user.

Inducements generally include one or more sets of parameters relating to a specific type of content, and the changes to be made to those parameters during implementation of the inducement. For example, a blurring inducement may relate to image sharpness parameters, and may include alterations to or implementations of e.g., resolution, mean filters, weighted average filters, Gaussian filters, etc.

In various embodiments, an eye-tracking module 104 may be used in conjunction with a camera 102 and/or other sensors 106 to track the location and/or gaze of the eyes of a user 150 to aid in accurately determining the eye status of the user 150. For example, the capability to more accurately determine the location and orientation of a user's gaze will increase the utility of the sensor(s) 102, 106 data by more accurately filtering relevant from non-relevant sensor data depending in part on eye accessibility of the sensor(s) 102, 106, distance, ambient lighting, and other factors.

In various embodiments, sensors 106 may include biometric sensors for determining one or more relevant conditions of the user 150 such as heart rate, breathing rate, skin tension and other sympathetic indicators that may be advantageously utilized to determine a degree of engagement or stimulation of the user 150. Such determination may be useful in establishing baseline and aberrant patterns of eye status conditions associated with that particular user 150 or a user group.

The camera 102 and other operatively-connected or on-board sensors 106 may detect eye status (and indicators thereof) based on detection of various characteristics associated therewith. For example, glint detection may be utilized to determine whether a user 150 has blinked, and may also be utilized with data regarding light sources (including displayed content 116) to determine the reflectivity of the eye surface, the degree to which the eye is open (e.g., by determining how much light is reflected and/or how much of the eye surface is reflecting such light). Glint detection and other sensor data reliant upon light sources may utilize ambient light, displayed content, or a dedicated light source (visible, IR, or otherwise) to make such assessments.

Eye status (and indicators thereof) may also be detected by observation (via sensors) of a region proximal to a user's eye. For example, movement or tension of the skin or muscles proximal the eye may be useful in determining whether a user is blinking, squinting, or moving the eye. Eye-proximal observations such as these advantageously provide an alternate approach to evaluating eye status that may be particularly useful when the wearing of e.g., glasses, hinders the reliable sensing of certain eye status indicators. Additionally, eye-proximal observations may be used to supplement direct eye observations, thereby advantageously increasing the reliability of sensed status indicators. Eye-proximal sensing may also be advantageous when utilized with wearable displays wherein sensors may be oriented such that they can detect relevant eye status information from eye-proximal areas disposed near the sensors, and need not be oriented directly towards the user's eye.

An analyzer module 108 may receive information from the eye-tracking module 104, camera 102 and other sensors 106 to determine the presence or absence of one or more predetermined eye status conditions (or precursors thereof). When a particular eye status threshold is met, the analyzer module 108 can provide notifications or data to the presentation module 112 that one or more inducements selected from the inducement store 110 should be introduced into the content 114 prior to presenting the visual output 116 to the user 150.

The threshold for determining whether an inducement should be introduced into the content stream may be fixed, dynamic, or a combination of both. For example, an initial preset threshold for a given eye status may be utilized until sufficient historical data is collected for that indicator and the particular user (or user group) and then the historical data may be used to set a custom threshold tailored for that user (or user group). One advantage of such a dynamic (i.e., self-adjusting) configuration is that it will adjust for normal variances among individuals to ensure that a particular user is not held to an arbitrary standard that may be suboptimal for that individual. Another advantage of a dynamic threshold system is that it may, over time, train a user (or user group) to incorporate increasingly beneficial eye behaviors by setting the dynamic threshold within a reasonable degree of variance from observed user-specific historical data, thus slowly increasing the rate of implementation in a non-obtrusive manner. Additionally, session-based historical observations may be useful when e.g., a user's eye demonstrates a particular eye status upon initiation of the session, thus establishing a baseline for that session based on the initial observations of eye status.

Figure 2:
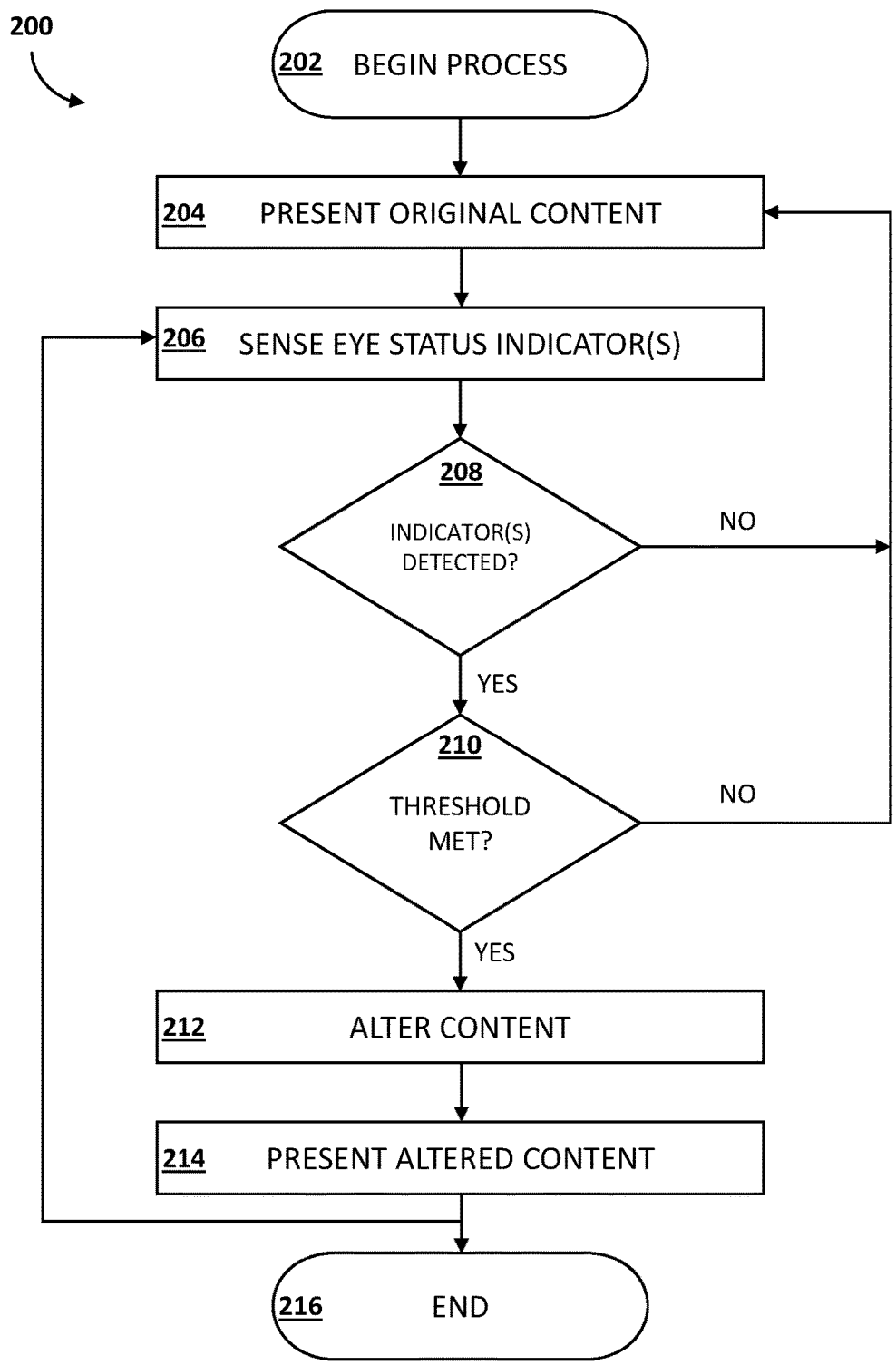
FIG. 2 is a diagram of illustrative events that may trigger the introduction of inducements into displayed content.

FIG. 2 is a diagram of an illustrative process 200 relating to interactions between embodiments of a display device 100, and a user 150. With reference to FIG. 1, typically the process 200 will occur during presentation of visual output 116 to the user 150. The process 200 may be embodied in a set of executable program instructions stored on one or more non-transitory computer-readable media, such as one or more disk drives or solid-state memory devices, of the display device 100 or of some other device in communication with the display device 100. When the program 200 is initiated, the executable program instructions can be loaded into memory such as RAM, and executed by a hardware processor (e.g., a CPU) of the display device 100 or another device in communication therewith. The process 200 (or portions thereof) may be executed by a plurality of processors, serially or in parallel, for example, in a multi-threaded CPU, or via a combination of CPU and GPU processing.

In one embodiment, certain inducements will be introduced into the visual output 116 via manipulation of one or more GPU rendering functions. While typically GPU rendering effects such as anti-aliasing, shading, anisotropic filtering, focusing, blurring, lighting, and/or shadowing are tuned to produce the best visual presentation within system constraints, in various embodiments these effects may be modified (e.g., de-tuned) to produce a predetermined alteration to the visual output 116, which would otherwise be considered sub-optimal, but will herein advantageously function as an inducement while also advantageously reducing demands on the system via, e.g., disabling or reducing one or more such functions selectively. Such an approach may be applied whether the GPU is discreet, combined with the CPU, or remotely connected to the display device 100.

In one embodiment, inducement will be introduced into the visual output 116 via manipulation of content data pulled from the content store 114 by the presentation module 112 prior to display to the user 150. For example, the content data stream may be modified by the presentation module 112 to incorporate certain visual effects such as blurring, shifting, flickering, dimming, and other effects selected to mimic various eye condition symptoms, thereby advantageously inducing the user 150 to take the naturally appropriate measure in response to such stimuli, without undue disruption of the user's concentration.

As shown in the illustrative process 200 of FIG. 2, with reference to modules and components of FIG. 1, in one embodiment the process typically begins (at 202), whether initiated by a user or automatically, with the presentation of visual output 116 to a user 150. Initially, the content is presented in original (unmodified) form (at 204) by the presentation module 112 or some other module or component of (or connected to) the display device 100.

During content presentation, one or more sensors 102, 106 will detect the existence of eye status indicators (at 206). Such indicators may include, but are not limited to, dryness (e.g., reflectivity, blink rate, etc.), immobility (gaze fixation), fixed or wavering focus, blink velocity (rate at which a single blink occurs, indicative of fatigue), squinting, twitching, watery eyes, pupil dilation, etc. A camera 102 or other image sensor may be utilized in conjunction with an eye-tracking component 104 which may aid the camera 102 in locating the eyes of the user 150 to more accurately sense eye status indicators at 206. Head-tracking via the user-facing camera 102 or other sensors 106 may also be utilized in conjunction with the eye-tracking module 104 to more accurately assess and adjust for eye accessibility of the sensors 102, 106, and increase the accuracy of detection of eye status indicators.

Content, drawn from the content store 110 will generally be continuously presented to the user 150 in unmodified form. If one or more eye status indicators are detected at 208, those will be evaluated at 210 to determine whether a threshold sufficient to trigger modification of content has been reached. If indicators are not detected at 208, or the predetermined threshold is not met at 210, the process will continue to sense eye status indicator(s) at 206 while presenting the unmodified content to the user 150.

If, however, at least one eye status indicator is detected at 208 which then meets the threshold at 210, the process will begin to alter the content drawn from the content data store 110 and present the modified content to the user 150. Modified content will then be presented to the user at 214 until eye status indicators are no longer detected at 208, or detected but fail to meet the threshold at 210.

Alteration of content at 212 is generally in the manner of introducing inducements selected from the inducement store 110 into the content drawn from the content store 114 prior to displaying the altered content to the user at 214. Preferably, the alteration of content at 212 will be in a manner selected to elicit a natural response from the user, the response typically correlating to a particular eye condition. For example, when a user is presented with blurred content, the user may reflexively blink, or refocus their gaze by, e.g., briefly glancing away from the content. If indicators meet the threshold for an extended lack of eye movement in 210, the inducement may be selected to cause dislocation (i.e., repositioning) of content at 212 prior to presentation at 214, thereby advantageously encouraging movement of the eyes of a viewer.

Thus, different indicator may be associated with different eye status conditions (possibly with some overlap) and the threshold(s) against which the indicators are compared in 210 may be established either arbitrarily (based on established criteria, or preliminary initialization settings) and/or may be dynamic (based on historical observations of a user or user group over time). In one embodiment, when multiple indicators are detected at 208 and multiple thresholds met at 210 the system may determine that multiple eye status conditions exist and may, on such basis, apply multiple inducements in altering the content at 212.

In one embodiment, the alteration of content at 212 may occur in phases or degrees of alteration, wherein upon selecting an inducement correlating to the eye status threshold met in 210, the alteration at 212 may be initiated gradually. Once the altered content is presented at 214, the system will continue to sense, detect and analyze (206, 208, 210) and if the threshold continues to be met at 210, the degree of alteration may be increased at 212 and then presented to the user at 214. Such a configuration advantageously provides for more subtle inducements upon initial introduction, that gradually become more obtrusive if eye status conditions do not improve in response to the initial alteration and presentation of content at 212 and 214, respectively.

In one embodiment, the degree of alteration via a selected inducement will be correlated to the degree a threshold is exceeded. Thus, for example, when as a dryness eye status condition increases, the degree of e.g., a permanence (i.e., flicker) inducement alteration of the visual content will increase.

In one embodiment, separate sensing and inducement may occur for multiple viewers of content from the same display device when a particular viewer's gaze is localized to a particular portion of, or object within, the displayed content. In such a configuration, the same sensor may be used to detect indicators that are localized to a particular viewer among multiple viewers via e.g., position of the viewer in the sensor field, or use of separate eye tracking modules and sensors to track multiple viewers' eyes. Inducements, if triggered, will be localized to that portion of the displayed content that is associated with that viewer's gaze. In another embodiment, where displayed content is presented in a split-screen or other segregated manner, each portion of the displayed content may be associated with a particular viewer and only that portion will be affected by inducements targeted to that viewer based upon analysis of the viewer-specific sensor data.

In one embodiment, inducements will be localized to only a portion of that displayed content upon which the viewer is focused. Eye-tracking modules and sensors may be utilized to determine the location of a viewer's gaze relative to the presented content.

Content presentation may be stopped at 216 by a user (e.g., by closing the application that is presenting the content, or shutting off the display device 100), by reading an end point of the content, or by some other means. In one embodiment, the process will save user-specific data prior to termination. Such data may include eye status indicators detected, inducements applied, alterations to eye status observed. Such data may also include, and be utilized to develop, user-specific averages and thresholds for future use with the same user, as well as for other uses. Saving user-specific session data in such a manner allows for more accurate tuning of the system over time, and greater efficacy for a particular user, with increased exposure.

In various embodiments, the sampling rate of sensor data may be substantially continuous, which is advantageous for consistently detecting random and rapid events such as blinking, or may be intermittent, which may be suitable for sensing dryness, redness and other eye status indicators that present less rapidly. Intermittent sensing may beneficially provide a lower power utilization while still providing enough sensor data for effectively monitoring certain eye status indicators.

In certain embodiments, instead of sensing the presence of adverse eye status indicators, the system may be configured to sense eye health indicators and will modify content in the absence of such indicators. For example, instead of sensing and then altering content upon detecting a sufficient threshold of dryness, the system would be configured so that content remains unaltered so long as a sufficient threshold of moisture (i.e., wetness) is observed in the eye, and alteration of content would commence upon no longer meeting a given threshold for a particular eye status indicator.

In one embodiment, a graphics processing unit (GPU) will be operatively connected to the sensor, processor, and display. The GPU may be integrated into the processor or processor assembly, or alternatively, the GPU may be a discreet component of the system. In operation, the GPU will process content for output to the display device. In certain embodiments, inducements will operate directly upon the GPU to temporarily alter at least one setting, resulting in a temporary reduction of visual quality during presentation of the altered content. Such embodiments may utilize system resources more efficiently by not requiring direct modification of content data and also by being fairly agnostic to the type of content data being presented. In certain embodiments, GPU-targeting inducements will deactivate or decrease one or more parameters of the GPU, to alter the presentation of content in a predetermined manner. Other advantages include less reliance on particular software implementations (e.g., OS-specific variations, etc.) which will beneficially provide for more uniform application across differing devices, vendors and operating systems The terms "user" and "viewer" are used interchangeably herein to identify a viewer of displayed content. Eye and eyes are used herein interchangeably, unless the singular or plural is specified.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as physical electronic hardware, or as a combination of computer software and physical electronic hardware. To clearly illustrate this interchangeability, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

In certain embodiments, various modules described herein may be combined into a single module that performs all of the functions described for any combination of separate modules. In certain embodiments, the distribution of functions among various modules may also vary from that described above.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for altering displayed content based upon a condition of a viewer's eye, comprising:
   a content data store configured to store computer-readable instructions relating to the displayed content;
   an inducement data store configured to store computer-readable instructions relating to the implementation of a plurality of predetermined changes to the displayed content;
   a processor for executing computer-readable instructions;
   a sensor configured to sense indicators of at least one predetermined eye status of a viewer's eye;
   an analyzer module operatively-connected to the sensor and configured to determine the existence and degree of the predetermined eye status based on data from the sensor;
   an operatively-connected display device; and
   a presentation module configured to provide altered and unaltered content to the display device.

2. The system of claim 1, wherein the eye status comprises at least one selected from dryness, blink rate, pupil size, reactivity, accommodation, redness, discharge, and sclera color and the plurality of predetermined changes comprise at least two selected from blurring, resizing, dislocating, brightness, contrast, transparency, permanence, and focal depth.

3. The system of claim 1, further comprising an operatively-connected GPU, wherein the computer-readable instructions of the inducement data store are configured to temporarily alter parameters of the GPU.

4. A computer-implemented method comprising:
   under control of one or more computing devices configured with specific computer-executable instructions,
      receiving, during presentation of visual content, data regarding at least one eye of a user to whom the visual content is being presented;
      determining whether the data regarding the at least one eye is relevant to a predetermined eye status;
      in response to determining that the data regarding the at least one eye is relevant to the predetermined eye status, assessing whether the relevant eye status data meets a threshold specific to the predetermined eye status;

upon assessing that the threshold is met by the relevant eye status data, selecting an inducement from an inducement data store; and applying changes defined by the inducement to the visual content during the presentation of the visual content to the user.

5. The method of claim 4, wherein the inducement is selected to correlate with the relevant eye status, such that the changes defined by the inducement will substantially mimic at least one symptom of the relevant eye status in a manner that decreases the perceived quality of the visual content.

6. The method of claim 4, wherein the inducement is selected to compensate for the relevant eye status.

7. The method of claim 4, further comprising establishing the threshold based upon a plurality of historical observations of the at least one eye of the user.

8. The method of claim 4, wherein receiving data regarding the at least one eye comprises tracking, via at least one eye-tracking sensor, at least one selected from the orientation, and the location, of the at least one eye.

9. The method of claim 8, further comprising adjusting for the orientation of the at least one eye prior to determining whether the condition meets the predetermined threshold.

10. The method of claim 4 further comprising sampling, via at least one sensor, at least one environmental factor and evaluating the sampled factor to assess environmental impact upon the condition of the at least one eye, wherein the environmental factor is selected from humidity, location of illumination sources, ambient light, angle of display, relative angle of display to the eye, environmental pollutants, and temperature.

11. The method of claim 4, further comprising evaluating a location proximal the at least one eye, via at least one sensor, at least one selected from brightness of displayed content, distance of the at least one eye from a display device, muscle tone, muscle tension, skin movement, and skin moisture.

12. The method of claim 4, wherein the predetermined eye status comprises at least one selected from dryness, blink rate, pupil size, reactivity, accommodation, redness, and discharge.

13. The method of claim 4, wherein the inducement-defined change to the displayed content comprises altering at least one selected from focus, size, location, brightness, contrast, transparency, permanence, font, and color.

14. The method of claim 4, wherein the altering is performed by modifying at least one parameter of an operatively-connected GPU.

15. The method of claim 4, wherein the changes to the visual content comprise degrading at least one visible aspect of the visual content.

16. The method of claim 4, further comprising repeating the receiving, determining, and assessing steps, as applicable, after applying changes defined by the inducement, and in response to an assessment that the threshold is no longer met, decreasing or discontinuing the changes applied to the visual content.

17. The method of claim 4, wherein the degree of changes applied is variable based on an amount by which the threshold is exceeded.

18. The method of claim 4, further comprising repeating the receiving, determining, and assessing steps, as applicable, after applying changes defined by the inducement, and in response to an assessment that the threshold is exceeded by a greater amount compared to a preceding assessment, performing at least one selected from increasing the degree of changes applied, and implementing at least one an additional inducement.

19. A non-transitory computer storage medium which stores a computer-executable module, the module, when executed by one or more processors, being configured to:

receive, during presentation of visual content, data regarding at least one eye of a user to whom the visual content is being presented;

determine whether the data regarding the at least one is relevant to a predetermined eye status, wherein the eye status comprises at least one selected from dryness, blink rate, pupil size, reactivity, accommodation, redness, discharge, and sclera color;

in response to determining that the data regarding the at least one eye is relevant to the predetermined eye status, assess whether the relevant eye status data meets a threshold;

upon assessing that the threshold is met by the relevant eye status data, select an inducement from an inducement data store, the inducement correlating to the predetermined eye status; and apply changes defined by the inducement to the visual content during the presentation of the visual content to the user.

20. The non-transitory computer storage medium of claim 19, wherein the application of the changes defined by the inducement continues until an automated and substantially continuous repetition of the determining and the assessing indicates that the threshold is no longer met.

* * * * *